United States Patent [19]

Tanaka et al.

[11] Patent Number: 4,985,918
[45] Date of Patent: Jan. 15, 1991

[54] AUTOMATIC DIALING APPARATUS AND METHOD OF AUTOMATIC DIALING

[75] Inventors: Shigeki Tanaka; Hiroki Satoo, both of Nara, Japan

[73] Assignee: Sharp Kabushiki Kaisha, Osaka, Japan

[21] Appl. No.: 382,489

[22] Filed: Jul. 21, 1989

[30] Foreign Application Priority Data

Jul. 26, 1988 [JP] Japan .................. 63-187773

[51] Int. Cl.$^5$ ............................................. H04M 1/00
[52] U.S. Cl. ..................................... 379/356; 379/216
[58] Field of Search .................... 379/355, 356, 216

[56] References Cited

U.S. PATENT DOCUMENTS

| | | | |
|---|---|---|---|
| 4,431,870 | 2/1984 | May et al. | 379/355 |
| 4,475,013 | 10/1984 | Lee et al. | 379/216 |
| 4,485,274 | 11/1984 | Jordan et al. | 379/355 |
| 4,503,291 | 3/1985 | von Holten et al. | 379/355 |

Primary Examiner—Jin F. Ng
Assistant Examiner—Jhancy Augustus

[57] ABSTRACT

An automatic dialing apparatus stores in a RAM an area code number, a local code number and a plurality of subscribers' telephone numbers in the area of the local code number thereof with hyphens for separating these numbers and telephone numbers from each other. It further displays a series of telephone numbers on a display portion in the apparatus in response to operation of a search key. When a local key is operated, a local code mark is detected, a local code number of digits higher than the local code mark is cancelled, and thus the telephone numbers of digits lower than the local code mark are displayed. Each time the local key is operated, the hyphens in the telephone numbers are searched for to be displayed. If a dial out key is operated when a desired telephone number is displayed, a tone signal corresponding to the desired telephone number is generated. Therefore, an arbitrary number can be selected from a series of numbers.

12 Claims, 5 Drawing Sheets

FIG. 6(a)  | ALP TEL | SHARP |
| | 0070 ⸰07436-5 |

FIG. 6(b)  | ALP TEL | SHARP |
| | ⸰07436-5Ⓢ-13 |

FIG. 6(c)  | ALP TEL | SHARP |
| | ⸰1321Ⓢ-4601Ⓢ |

FIG. 6(d)  | ALP TEL | SHARP |
| | ⸰4601Ⓢ-0422Ⓢ |

FIG. 6(e)  | ALP TEL | SHARP |
| | ⸰0422Ⓢ-2947 |

FIG. 6(f)  | ALP TEL | SHARP |
| | ⸰2947 |

AUTOMATIC DIALING APPARATUS AND METHOD OF AUTOMATIC DIALING

BACKGROUND OF THE INVENTION

1. Field of the Invention

The present invention relates generally to an automatic dialing apparatus and a method of automatic dialing. More particularly, it relates to an automatic dialing apparatus and a method of converting a telephone number, previously registered, to a corresponding tone signal to generate the same automatically.

2. Description of the Background Art

A conventional automatic dialing apparatus comprises a storage device provided in a telephone set or a separate electronic device. I can store a number of telephone numbers and other related information such as addresses and names, and a function to convert the stored information to their corresponding tone signals. When any desired one of a plurality of previously registered telephone numbers is called by operating a search key, the corresponding tone signal is outputted by operating a dial out key without pressing a numeral key, thereby to carry out automatic dialing.

A telephone number includes an area code number, a local code number and a subscriber's number. Therefore, the area code number, the local code number and a subscriber's number are registered in advance in the automatic dialing apparatus. By first operating the search key to read a desired telephone number and then operating the dialing key, the tone signals each corresponding to the area code number, the local code number, and the subscriber's number are generated. However, when a telephone call is made in the same city, (i.e., the area of the same area code number), the tone signal of the area code number need not be generated. Therefore, in the conventional automatic dialing apparatus, a discriminating code called a local code mark is inputted between the area code number and the local code number in a registration of the telephone number. Thus, when a telephone call is made in the same city, the area code number is cancelled by operating a cancel key, thereby to generate a tone signal corresponding to the local code number and the subscriber's number.

Recently, an increased number of offices and companies are employing a so-called dial-in system, which allows direct dialing without passing through a switchboard. Each of the telephone numbers given to the telephone sets provided in such offices and companies have the same area code number, and local code number but each different subscriber's number. Thus, it is desirable that after each different subscriber's number is registered in association with the same area code number and local code number and then the tone signal corresponding to the area code number and local code number are generated, a tone signal corresponding to each of the desired subscribers, numbers is generated.

However, in the conventional automatic dialing apparatus, the local code mark is fixedly set between the area code number and the local code number as described above. Thus, an arbitrary number cannot be selected from a series of telephone numbers when necessary. Accordingly, even if each of the telephone numbers comprises the same area code number and local code number, automatic dialing should be carried out by registering each of the telephone numbers in association with the area code number and the local code number so as to generate the tone signal corresponding to the area code number and local code number and subscriber's number without employing the local code mark, or to generate the tone signal corresponding to the local code number and subscriber's number by employing the local code mark. Therefore, the conventional automatic dialing apparatus has the disadvantage of inefficiency.

SUMMARY OF THE INVENTION

It is an object of the present invention to provide an automatic dialing apparatus and a method of automatic dialing which allow a discriminating mark to shift to an arbitrary part of a series of telephone numbers to output only a selected number as automatic dialing information.

According to a brief description of the present invention, a plurality of telephone numbers are stored in a memory portion with the addition of separating information for separating each of the telephone numbers. Then the plurality of telephone numbers and the separating information are read to be displayed in a display portion in response to a search instruction supplied from a search instructing portion. Further, in response to a cancel instruction supplied from a cancel instructing portion, the separating information for separating the plurality of telephone numbers is searched for and the discriminating mark is set at a searched place. Thus a tone signal corresponding to a telephone number of digits lower than the discriminating mark is generated from a tone signal converting portion.

Therefore, according to the present invention, when performing automatic dialing of a series of telephone numbers which are searched for, the numbers of lower digits, lower than arbitrary separating information, can be selected. This occurs by sequentially shifting the discriminating mark to the place of the separating information in response to an instruction from the cancel instructing portion, thereby resulting in an efficiency improvement in dialing operations.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
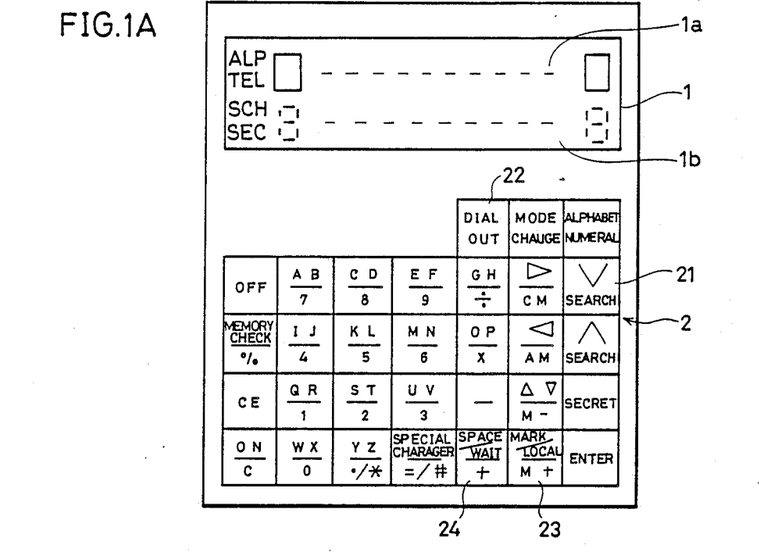
FIG. 1A is a top plan view of one embodiment of the present invention.
Figure 1B:
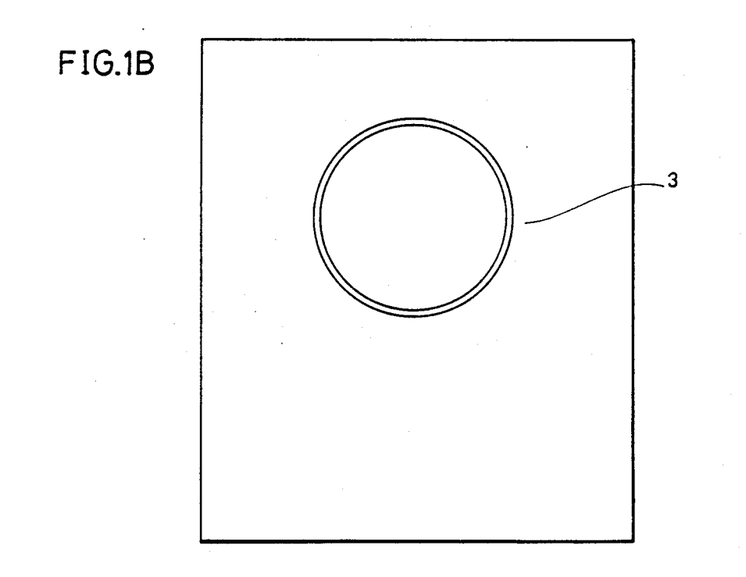
FIG. 1B is a bottom plan view of one embodiment of the present invention.

FIGS. 1A and 1B show the top and bottom plan views according to one embodiment of the present invention, respectively.

First of all, the external configuration of one embodiment of the present invention will be described with reference to FIGS. 1A and 1B. A display portion 1 is, for example, formed of a liquid crystal display board and includes an upper display area 1a formed of dot matrix 12 digits and a lower display area 1b formed of 7 segment 12 digits The upper display area 1a displays information such as names, and the lower display area 1b displays information such as telephone numbers. A keying portion 2 includes alphabet/numeral keys, various function keys, a designation key for shifting a carsol, etc. Particularly, in one embodiment of the present invention, the keying portion 2 includes search keys 21 for searching for telephone numbers, a dial out key 22 for instructing generation of tone signals, a local key 23 for inputting a local code mark, and a wait key 24 for instructing a wait function.

The keying portion 2 shown in FIG. 1A has a function of controlling a schedule as well as a telephone directory mode for automatic dialing of the telephone numbers. Thus, numerous keys are provided therefor. However, since the described functions and keys are not particularly related to the function of the present invention, the detailed description thereof is not given. As shown in FIG. 1B, a sound producing portion 3 for producing a sound with a tone signal outputted by the operation of the dial out key 22 is provided at the back side of the apparatus, so that a telephone call can be made by setting a mouth piece of a telephone set in this sound producing portion 3.

Figure 2:
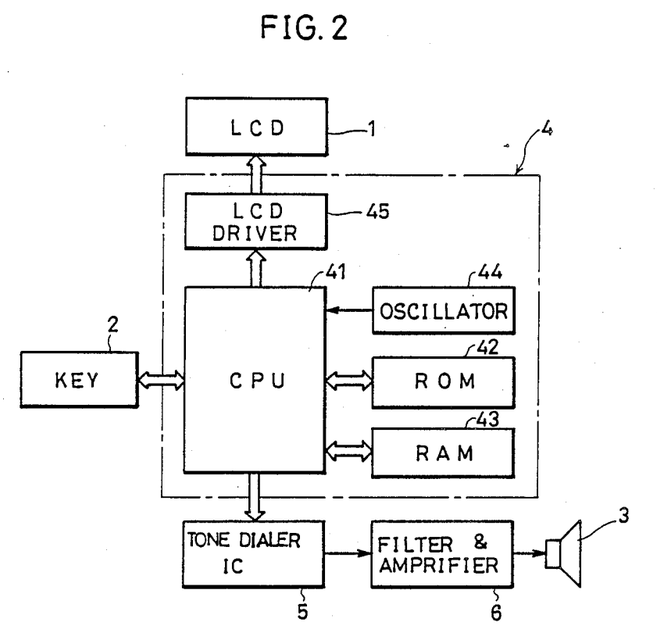
FIG. 2 is a schematic block diagram of one embodiment of the present invention.
Figure 3:
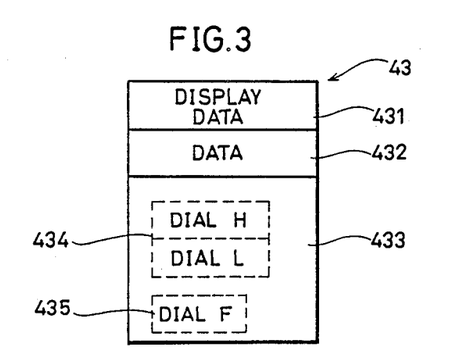
FIG. 3 is a diagram illustrating data stored in a RAM shown in FIG. 2.

FIG. 2 is a schematic block diagram of one embodiment of the present invention, and FIG. 3 is a diagram illustrating data stored in a RAM shown in FIG. 2.

An electrical configuration of one embodiment of the present invention will be described with reference to FIGS. 2 and 3. The display portion 1 and the keying portion 2 shown in FIG. 1A are connected to a microcomputer 4 as shown in FIG. 2. The microcomputer 4 comprises a CPU 41, a ROM 42, a RAM 43, an oscillator circuit 44 and an LCD driver 45. The ROM 42 has already stored programs based on flow charts shown in FIGS. 4 and 5, as will be described later. The CPU 41 carries out required processing according to the programs stored in the ROM 42. That is, the CPU 41 has functions of rearranging inputted information such as a row of letters and numerals according to a specified order (such as alphabetical order) to store the same, searching the stored group of information for desired information, and performing operations such as an arithmetic operation. The RAM 43 comprises areas 431 to 434 shown in FIG. 3, which will be described later. The oscillator circuit 44 generates a clock signal for determining a timing for operation of the CPU 41. The LCD driver 45 allows display data outputted from the CPU 41 to be displayed at the display portion 1.

Furthermore, a tone dialer IC5 is connected to the microcomputer 4. The tone dialer IC5 receives a signal corresponding to number data outputted from the microcomputer 4 to be dialed out, and outputs a tone signal adapted for DTMF dialing. This tone signal is outputted as a sound from the sound producing portion 3 via a filter and amplifier portion 6.

The area 431 of the RAM 43 stores the display data outputted to the display portion 1 via the LCD driver 45. By setting an arbitrary one bit to "1" or "0", with each bit corresponding to each dot (including a segment and a symbol) in the display portion 1, the area 431 determines lighting on/off of each arbitrary one bit corresponding one of the dots on the display portion 1. The area 432 serving to store data of a registered telephone number is capable of storing the telephone number data up to 60 digits per subscriber. Particularly, addresses $00_H$–$4F_H$ are employed as an input buffer, so that such operations as inputting, correcting and displaying of the data are only performed for the data stored in this buffer. Addressing of the area 432 is carried out by operating a register provided in the CPU 41. When a specified address such as a start address is stored in automatic dialing, which will be described later, the content of the register for addressing is transferred to the area 433. The area 433 is employed as a working RAM and for calculating numerals and temporarily storing the data. Moreover, the area 433 in one embodiment of the present invention includes a register region (4 bit x 2) 434 called a DIAL X and a flag region (1 bit) 435 called a DIAL F in order to implement an automatic dialing system having a function of shifting a local code mark and a wait function.

The DIAL X register 434 is a combination of 4-bit data stored in a DIAL L register and in a DIAL H register. In addition, when the automatic dialing function is executed for generating the tone signal corresponding to the telephone number from the sound producing portion 3, data reading starts from an address of the area 432 designated with a value of the DIAL X register 434. When outputting is interrupted by a wait symbol (a space S), an address of the data next to the wait symbol S is stored, and the address becomes head data when the data corresponding to the address is next outputted. Furthermore, when a local function is executed, a search starts from the address of the area 432 designated with the value of the DIAL X register 434, and searching continues until the local code mark "□" or a hyphen "—" is found. Accordingly, when the local code mark "□" or the hyphen "—" is found, the address of the next data is stored in the DIAL X register 434. Then, upon the subsequent searching, searching starts from the data corresponding to the stored address. The flag area 435 makes selection during searching for the local code mark "□" and for the hyphen "—", upon execution of the local function.

Figure 4:
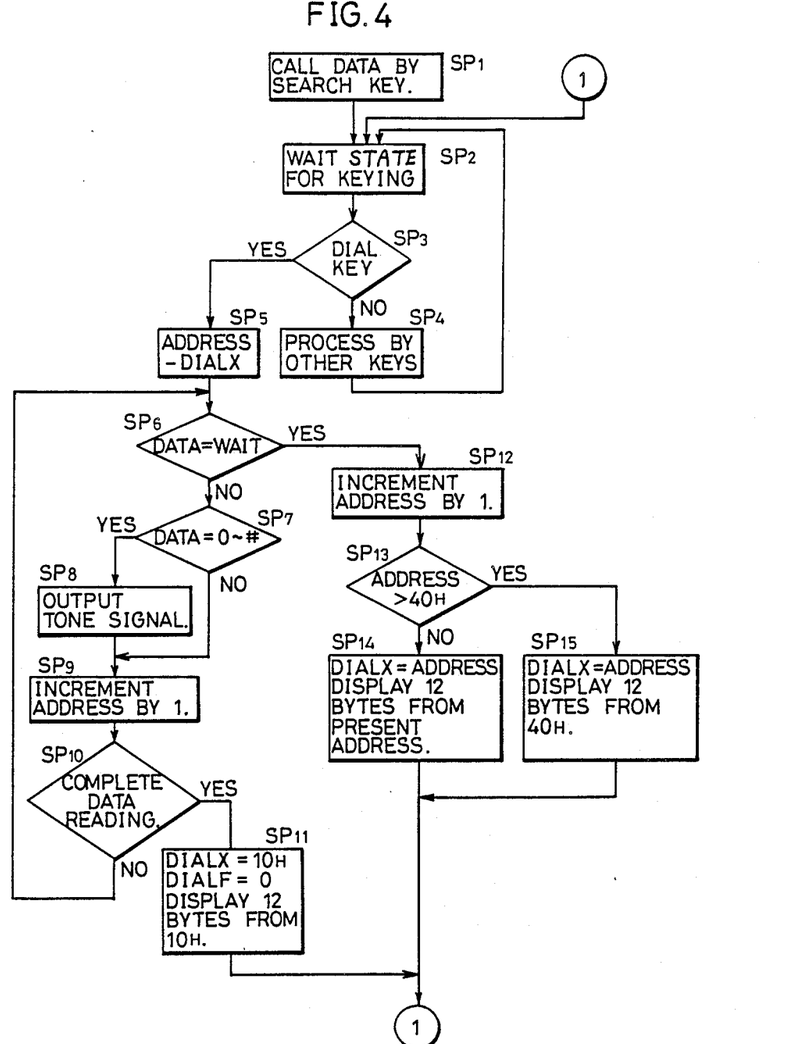
FIGS. 4 and 5 are flow charts for illustrating detailed operations of one embodiment of the present invention.
Figure 5:
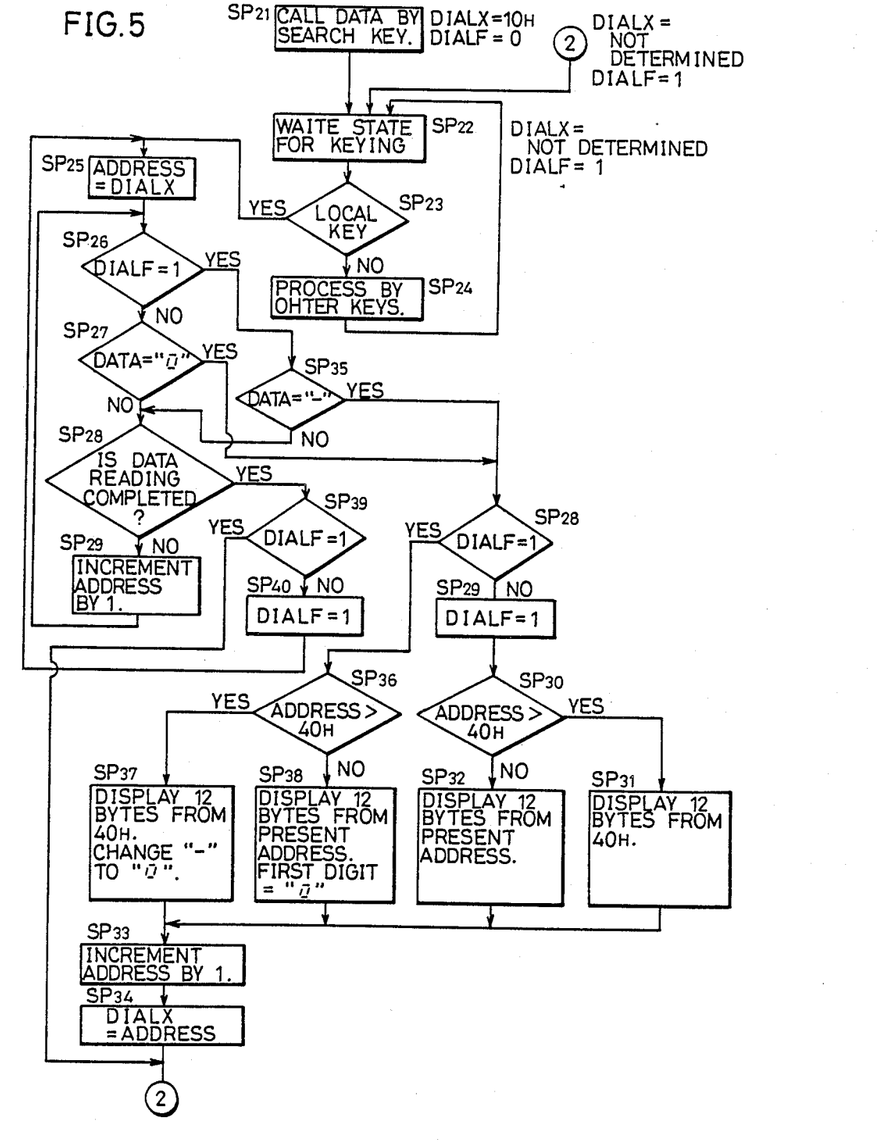

FIGS. 4 and 5 are flow charts for illustrating the operation of one embodiment of the present invention; particularly, FIG. 4 illustrates the automatic dialing function, and FIG. 5 illustrates the local function. FIG. 6 is a diagram illustrating changes in the content of the display in the display portion of one embodiment of the present invention.

Next, the detailed operation of one embodiment of the present invention will be described with reference to FIGS. 1A to 6. First of all, shifting of the local code mark in an automatic dialing operation is described. The local code mark is displayed in the upper segment portion "□" of 7 segments in each of the digits constituting the lower display area 1b. For example, it is assumed that the registered content of the telephone number, "0070 □ 07436—5—1321" is registered in the area 432 of the RAM 43, corresponding to the name SHARP. In this example, the local code mark "□" is set at the fifth digit, and hyphens are set as separating information at the eleventh digit and thirteenth digit. The local code mark and the hyphens are ignored in the dial out when the tone signal is generated corresponding to the telephone number. Thus the number data, only is outputted sequentially.

Figure 6A:
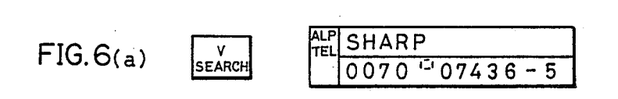
FIG. 6 is a diagram illustrating modifications in the content of a display in one embodiment of the present invention.
Figure 6B:
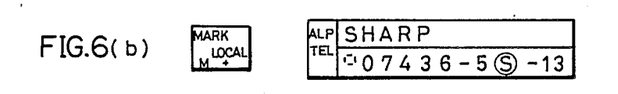
Figure 6C:
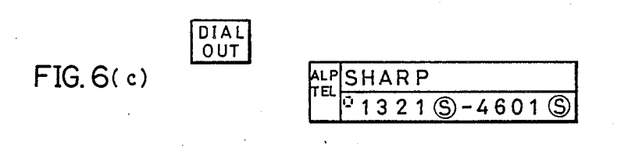
Figure 6D:
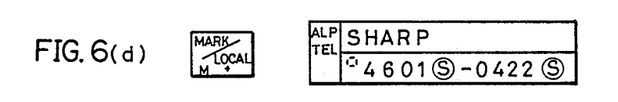
Figure 6E:
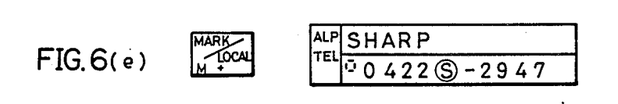
Figure 6F:
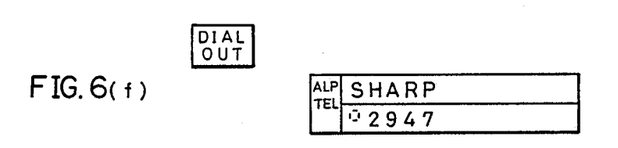

Next, the wait function will be described. The wait function is executed by inserting a space S through operating the wait key 24 of the keying portion 2. That is, the wait function registers, with efficiency, a number of telephone numbers having the common area code number and local code number and is employed when calling a desired one telephone number of these plural telephone numbers. For example, suppose such telephone numbers as "07436 ☐ 07436—5S-1321S-4601S-0422S-2947" are registered and then the telephone number "07436—5—0422" is automatically dialed by calling these telephone numbers. When the search key 21 is operated, the telephone number data registered in the manner shown in FIG. 6(a) are sequentially displayed from the upper digits. Next, when the local key 23 is operated, the display contents of the display portion 1 are shifted to a place lower than the local code mark. When the dial out key 22 is operated in this state, the data "07436—5" placed between the local code mark and the first space S is automatically dialed. With the dial out operation, the local code mark is shifted to the place of the space S, and as shown in FIG. 6(c). It is shifted to and displayed at the first place of the hyphen in the data which is not yet dialed.

After automatic dialing of the upper digits is performed through the above described operation, if the local key 23 is operated until a desired telephone number of lower digits "0422" comes out, the local code mark shifts to the first place of the hyphen and thus the display shifts. If the dial out key 22 is operated when a desired telephone number of lower digits comes out at the head digit, the tone signal corresponding to the telephone number thereof is generated.

Therefore, when the telephone number is stored in the area 432 of the RAM 43, i.e., when the data of the lower digits is inputted sequentially after the data of the upper digits such as the area code number is inputted, the storage information is constituted by inserting the spaces S in advance as well as the hyphens, so as to separate each of the data and by providing the above described wait function. Thus, input information such as the area code number used in common can be reduced, resulting in the effective use of the memory device.

Next, the operation of the automatic dialing function will be described in detail with reference to FIG. 4. In the step (hereinafter abbreviated to SP as in the figures) SP1, when the search key 21 is operated, the CPU 41 reads the telephone number data previously registered in the area 432 of the RAM 43 and stores the same as display data in the area 431. This display data is transmitted to the LCD driver 45, and the LCD driver 45 displays the telephone number data on the display portion 1 in the manner shown in FIG. 6(a). In the step SP2, the CPU 41 is on standby for the next keying. After keying, the CPU 41 decides whether or not the dial out key 22 is operated in the step SP3. When the CPU 41 decides that some key other than the dial out key 22 is operated, it carries out a process corresponding to the operated key in the step SP4. The CPU 41 proceeds to the step SP5 after deciding that the dial out key 22 is operated.

In the step SP5, the CPU 41 determines an address of the head data in the telephone number of a plurality of digits which is to generate tone signals. An address stored in the DIAL X register 433 is employed as a value of this address. The CPU 41 decides whether or not the data is a wait symbol S in the step SP6. If the data is not the wait symbol S, the CPU 41 proceeds to the step SP7 and decides whether or not the data are codes representing 0–9, * and #. If the data are these codes, the CPU 41 outputs the codes to the tone dialer IC5. The tone dialer generates a tone signal corresponding to each of the codes and generates each of the tone signals with sound from the sound producing portion 3 via the filter and amplifier 6.

If the tone signals are outputted in the step SP8, or unless the data are 0–9, * and # in the step SP7, the CPU 41 increments the address by one. Further, the CPU 41 decides whether or not the data reading is completed in the step SP10. The CPU 41 carries out this decision when the address exceeds a data region in the area 432 and when the data is a completion code. Unless the data is completed, the CPU 41 returns to the step SP6 and carries out processing of the step SP6 through the step SP10 in the same manner as in the foregoing description.

After deciding that processing of the data is normally completed in the step SP10, the CPU 41 stores an address $10_H$, which is a head address of the telephone number data, in the DIAL X register 434, and also displays the telephone number data starting from the address $10_H$ on the display portion 1. It then returns to the wait state for keying in the step SP2.

Next, description will be given on the operation in the step SP6 when the CPU 41 decides that the data is the wait symbol S. In the step SP12, the CPU 41 increments the address by one and stores an address of the next digit to the wait symbol S in the DIAL X register 433. In the step SP13, the CPU 41 decides whether or not the address exceeds $40_H$. This is possible because the area 432 is capable of registering 5 blocks of the telephone number of 12 digits, i.e., a maximum of 60 digits, and a head address at the fifth block is $40_H$. Therefore, if the address of the DIAL X register 433 is $40_H$ or less, the CPU 41 reads the data of 12 bytes from the area 432 in response to the address stored in the DIAL X register 433 so as to display on the display portion 1. If the address of the DIAL X register 433 exceeds $40_H$, the CPU 41 reads the data of 12 bytes from the area 432 in response to the so as to display on the display portion 1. If the address in the step SP15.

The local function will now be described. In the case that a tone signal is generated which corresponds to all the data including the area code number and the local code number in the telephone number to be called, in the local function, when all the data are called by operating the search key 21 and then the dial out key 22, the tone signal is generated which corresponds to the telephone number data of all the digits regardless of an input place of the local code mark.

In the case that the upper digits are to be cancelled and skipped to a previously determined place of the local code mark, if the local key 23 is operated after the telephone number data of all the digits are called by operating the search key 21, the first inputting of the local key causes the data of the digits higher than the address at the place of the previously registered local code mark to be skipped and displayed. Furthermore, in the case that a skip is required, continuous operations of the local key 23 cause the set hyphens of the lower digits to be searched for each time the local key 23 is operated so as to renew the address information. When the dial out key 22 is then operated, a tone signal is generated which corresponds to the data coming after each of the hyphens.

The operation thereof will be described in further detail with reference to FIG. 5. When the search key 21 is operated, the CPU 41 reads data from the area 432 according to the address stored in the DIAL X register 434 so as to display the same on the display portion 1, in the step SP21. In the step SP22, the CPU 41 is rendered to be at the wait state for keying. Further, when some keying is carried out, it decides whether or not the keying is the inputting of the local key 23 in the step SP23. If it is not the inputting of the local key 23, the CPU 41 carries out a process corresponding to the keying thereof in the step SP24. After the CPU 41 decides that the local key 23 is operated, it reads registration data from the area 432 according to the address stored in the DIAL X register 434 in the step SP25. The CPU 41 decides whether or not the dial flag of the area 435 is "1" in the step SP26. If the dial flag is not set, the CPU 41 searches for the local code mark in the step SP27. If the CPU 41 cannot search for the local code mark in the step SP27, it decides whether or not the data reading is completed in the step SP28. If the data reading is not completed, the CPU 41 increments the address by one in the step SP29 and then returns to the step SP26.

With the above described operation repeated, the CPU 41 proceeds to the step SP28 after deciding whether or not the local code mark is searched for in the step SP27. The CPU 41 decides whether or not the dial flag is set in the step SP28, and then if the dial flag is not set, it sets the dial flag in the step SP29 and proceeds to the step SP30. The CPU 41 decides whether or not the address of the DIAL X register 434 exceeds $40_H$ in the step SP30. If the address exceeds $40_H$ the CPU 41 displays the telephone number data of 12 bytes from the address $40_H$ on the display portion 1 in the step SP31. However, since the address is not exceeding $40_H$ here, the CPU 41 displays the number data of 12 bytes from the present address on the display portion 1 in the step SP32. Then, the CPU 41 increments the address by one to store the same in the DIAL X register 434 in the step SP33 and proceeds to the step SP22.

As has been described, after the telephone number is displayed on the display portion 1 by operating the search key 21 in such display manner as shown in FIG. 6(a), the address is incremented until the local code mark "□" is detected by operating the local key 23. When the local code mark "□" is then detected, 12 digit data of the digits higher than the local code mark are displayed as shown in FIG. 6(b). Further, when the dial out key is operated, a tone signal which is, for example, corresponds to "07436—5" is generated with sound from the sound producing portion 3 through the operations of the steps SP3 to SP11 as described in FIG. 4.

When the local key 23 is again operated, the CPU 41 decides that the local key 23 is operated in the step SP23 and stores an address next to the local code mark "□" in the DIAL X register 434 in the step SP25. In the step SP26, the CPU 41 decides whether or not the dial flag is set, and proceeds to the step SP35 after deciding the dial flag is set. The CPU 41 decides whether or not the data is "—" in the step SP35. If the data is not "—", the CPU 41 decides whether or not the data reading is completed in the step SP28. Then, if the data reading is not completed, it increments the address in the step SP29. Further, the CPU 41 repeats the operations of the steps SP26, SP35, SP2 and SP29 until detecting the "—".

After deciding that the "—" is detected in the step SP35, the CPU 41 proceeds to the step SP28 to decide that the dial flag is set and then proceeds to the step SP36. In the step SP36, the CPU 41 decides whether or not the address exceeds $40_H$, and if exceeding the value, it displays the data of 12 bytes from the address $40_H$ and also changes the detected "—" to "□" to display the same. Unless the address exceeds $40_H$, the CPU 41 displays the data of 12 bytes from the present address and also displays the local code mark " " at the first digit. The CPU 41 then increments an address in the step SP33, stores the address in the DIAL X register 434 in the step SP34 and returns to the step SP22.

With the above described operations repeated, the CPU 41 decides that the data reading is completed in the step SP28 and that the dial flag is set in the step SP39, and then goes back to the step SP22. Unless the dial flag is set in the step SP39, the CPU 41 sets the dial flag in the step SP40 and goes back to the step SP25.

In accordance with one embodiment of the present invention, as has been described in the foregoing, since the local code mark "□" can be shifted, an arbitrary number can be selected from a series of telephone numbers, resulting in further improvements in the automatic dialing function and also the effective use of the memory device for data storage.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic dialing apparatus for converting one of a plurality of telephone numbers, each including plural sets of digits, one set corresponding to each of an area code, local code, and subscriber code, respectively, to a corresponding tone signal and outputting the same, comprising:
    storage means for sequentially storing said plurality of telephone numbers, each including at least one common set of digits, said at least one common set of digits stored once with separating information and at least one uncommon set of digits for each of said plurality of telephone numbers, said separating information separating the plurality of at least one uncommon set of digits for said plurality of at least one uncommon set of digits for said plurality of telephone numbers from each other;
    search instructing means for instructing searching of the plurality of telephone numbers for a telephone number to be output;
    cancel instructing means for instructing sequential cancellation of conversion of said sequentially stored plurality of telephone numbers to a tone signal;
    display means for sequentially displaying the plurality of telephone numbers, displaying said at least one uncommon set of digits with said separating information separating each of said plurality of telephone numbers stored in said storage means;
    tone signal converting means for converting and subsequently outputting one of a plurality of said telephone numbers to a tone signal; and
    control means responsive to an instruction from said search instructing means for reading and subsequently displaying on the display means, the plurality of telephone numbers, with the separating information, from said storage means, and further, responsive to sequential instructions from said cancel instructing means, for sequentially searching the separating information for separating said plurality of read telephone numbers, and for sequentially shifting and finally setting a discriminating mark to replace each sequential separating information in a search place, in response to each said cancellation instruction and thus cancelling tone signal generation corresponding to telephone numbers previously sequentially stored before said separating information replaced by the set discriminating mark, and subsequently generating a tone signal, corresponding to a telephone number previously sequentially stored after said separating information replaced by the set discriminating mark, by said tone signal converting means.

2. An automatic dialing apparatus in accordance with claim 1, further comprising:

tone instructing means for transmitting an instruction for converting a telephone number to a tone signal, said control means including means responsive to an instruction from said tone instructing means for generating a tone signal corresponding to a telephone number of said at least one uncommon set previously stored after said set discriminating mark from said tone signal converting means.

3. An automatic dialing apparatus in accordance with claim 1, wherein:

said display means includes a display region for displaying information corresponding to said at least one common set and, for each of said plurality of telephone numbers, displaying said at least one uncommon set and the separating information, sequentially displayed from one end to another end of said display means thereof, said control means includes means, responsive to an instruction from said cancel instructing means, for sequentially shifting said information displayed in said display region from said one end toward said another end and sequentially displaying said stored separating information searched for and said at least one uncommon set of digits for each of said plural telephone numbers.

4. An automatic dialing apparatus in accordance with claim 3, wherein said control means includes, register means for storing the plurality of telephone numbers read from said storage means with the separating information, and means responsive to an instruction from said cancel instructing means for searching for the separating information stored in said register means and storing the discriminating mark to replace separating information in a searched area of the register means, and wherein said tone signal converting means includes means for generating the tone signal corresponding to the telephone number previously sequentially stored after said separating information replaced by the discriminating mark stored in said register means and cancelling tone signal generation corresponding to information previously stored before said separating information replaced by the discriminating mark.

5. An automatic dialing apparatus as claimed in claim 1, wherein each said plurality of telephone numbers include a common area code and local code and an uncommon subscriber code.

6. An automatic dialing apparatus, as claimed in claim 5, wherein said control means controls said tone signal converting means to convert said subscriber code of said telephone number previously sequentially stored after said separating information replaced by the set discriminating mark and cancelling said common area code and local code and said uncommon subscriber codes corresponding to said telephone number previously sequentially stored before said separating information replaced by the set discriminating mark.

7. A method in an automatic dialing apparatus wherein a plurality of telephone numbers, each including at least one common set of digits corresponding to at least one of area code, local code and subscriber code, are stored with plural separating information, the at least one common set of digits stored once and at least one uncommon set of digits for each of said plurality of telephone numbers being sequentially stored and separated by separating information, and subsequently any desired one of the telephone numbers is converted to a corresponding tone signal for outputting the same, said method comprising the steps of:

reading and subsequently displaying said plurality of telephone numbers along with the separating information, sequentially;

searching for said plural separating information of said plurality of read telephone numbers in response to a sequentially activated cancel instruction, and sequentially replacing each said plural separating information with a discriminating mark, different from the separating information, which is set in a sequentially searched place and the searched place is also stored to thereby cancel tone generation of said plurality of telephone numbers stored previous to said separating information replaced by said discrimination mark; and generating a tone signal corresponding to said at least one uncommon set of digits of a telephone number previously stored subsequent to said separating information replaced by said discriminating mark, in response to a tone generating instruction.

8. A method, as claimed in claim 7, wherein said plurality of telephone number includes common area and local codes and an uncommon subscriber code.

9. An automatic dialing apparatus for converting one of a plurality of telephone numbers, each including plural sets of digits, one set corresponding to each of an area code, local code and subscriber code, to a corresponding tone signal and outputting the tone signal, the apparatus comprising:

memory means for sequentially storing said plurality of telephone numbers, each including at least one common set of digits, said memory means first storing said at least one common set of digits and then sequentially at least one set of uncommon set of digits for each of said plurality of telephone numbers and separating information separating each of said plurality of telephone numbers;

discriminating mark setting means for, upon activation, initially storing and setting a discriminating mark prior to said stored at least one common set of plural digits of said plurality of telephone numbers;

display means for initially displaying said discriminating mark, said of at least one common set of digits, and sequentially displaying said at least one set of uncommon sets of digits and said separating information corresponding to said stored plurality of telephone numbers;

dial means for, upon initial activation, cancelling output of said at least one common set of digits from said memory means to a tone signal converting means and subsequently shifting said discriminating mark to replace a first sequentially stored separating information;

said display means sequentially displaying said discriminating mark in place of said replaced separating information and sequentially displaying data stored subsequent to said replaced separating information;

said discriminating mark setting means, upon subsequent activation, sequentially replacing each of said plurality of separating information;

said display means sequentially displaying said discriminating mark in place of said replaced separating information and sequentially displaying data stored subsequent to said replaced separating information;

said dial means, upon subsequent activation, outputting said at least one uncommon set of digits from said memory means, displayed immediately subsequent to said discriminating mark and prior to displayed separating information, to said tone signal converting means for subsequent conversion to a tone signal, to thereby allow a user to efficiently store a plurality of telephone numbers with at least one common set of digits and to efficiently access a desired one of said plurality of telephone numbers through sequential setting of a discriminating mark and shifting of the discriminating mark through said at least one uncommon set of digits for each of a plurality of telephone numbers.

10. An automatic dialing apparatus as claimed in claim 9, wherein each said plurality of telephone numbers includes common area and local codes and or uncommon subscriber codes.

11. An automatic dialing apparatus as claimed in claim 10, wherein said tone signal converting means converts the subscriber code of a desired telephone number previously sequentially stored after said separating information replaced by the discriminating mark.

12. A method for sequentially efficiently storing a plurality of telephone numbers, each including a common area code and local code and an uncommon subscriber code, in minimal memory and for automatically dialing one of the plurality of stored telephone numbers through the use of a shifting discriminating mark for quick, easy, and accurate automatic dialing, the method comprising the steps of:

(a) storing a discrimination mark and an area code and a local code common to each of a plurality of telephone numbers;

(b) storing, sequentially, a subscriber code for each of the plurality of telephone numbers and further storing separation symbols, separating each sequentially stored subscriber code;

(c) displaying said previously stored information in a sequential manner, including said discrimination mark, common area code, and common local code;

(d) cancelling said common area and local code and shifting said discrimination mark so as to replace a first stored separation symbol;

(e) displaying said shifted discrimination mark and subscriber code and separation information stored subsequent to said replaced separation symbol;

(f) shifting said discrimination mark to sequentially replace each said stored separation symbol and subsequently displaying said shifted discrimination mark and subscriber code and separation information stored subsequent to said replaced separation symbol to enable a user to sequentially access any one of a plurality of telephone numbers based on its subscriber code;

(g) outputting and tone converting a subscriber code, displayed immediately subsequent to the discrimination mark to automatically dial the corresponding telephone number.

* * * * *